(12) United States Patent
Matsumoto

(10) Patent No.: US 11,958,039 B2
(45) Date of Patent: Apr. 16, 2024

(54) ZIRCONIA-BASED POROUS BODY AND METHOD FOR MANUFACTURING ZIRCONIA-BASED POROUS BODY

(71) Applicant: DAIICHI KIGENSO KAGAKU KOGYO CO., LTD., Osaka (JP)

(72) Inventor: Kazuya Matsumoto, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days.

(21) Appl. No.: 17/777,244

(22) PCT Filed: Jan. 31, 2022

(86) PCT No.: PCT/JP2022/003511
§ 371 (c)(1),
(2) Date: May 16, 2022

(87) PCT Pub. No.: WO2022/107900
PCT Pub. Date: May 27, 2022

(65) Prior Publication Data
US 2023/0125091 A1    Apr. 27, 2023

(30) Foreign Application Priority Data

Aug. 12, 2021    (JP) ................................. 2021-131514

(51) Int. Cl.
| | | |
|---|---|---|
| *B01J 21/06* | (2006.01) | |
| *B01J 23/10* | (2006.01) | |
| *B01J 35/10* | (2006.01) | |
| *B01J 35/61* | (2024.01) | |
| *B01J 35/63* | (2024.01) | |
| *B01J 35/64* | (2024.01) | |
| *B01J 37/08* | (2006.01) | |

(52) U.S. Cl.
CPC ............. *B01J 21/066* (2013.01); *B01J 23/10* (2013.01); *B01J 35/61* (2024.01); *B01J 35/633* (2024.01); *B01J 35/651* (2024.01); *B01J 37/08* (2013.01)

(58) Field of Classification Search
CPC .... B01J 23/10; B01J 35/1004; B01J 35/1038; B01J 35/1066; B01J 37/08
See application file for complete search history.

(56) References Cited

U.S. PATENT DOCUMENTS

| | | | |
|---|---|---|---|
| 9,956,543 B2* | 5/2018 | Kodama | ................ B01J 37/031 |
| 2003/0224931 A1 | 12/2003 | Yamamoto et al. | |
| 2006/0018822 A1 | 1/2006 | Okamoto | |
| 2008/0050593 A1 | 2/2008 | Okamoto | |
| 2008/0120970 A1 | 5/2008 | Hilgendorff et al. | |
| 2009/0258781 A1 | 10/2009 | Maruki et al. | |
| 2016/0121301 A1 | 5/2016 | Shingai et al. | |
| 2016/0207027 A1 | 7/2016 | Kodama | |
| 2018/0282225 A1 | 10/2018 | Takai | |
| 2022/0106195 A1 | 4/2022 | Matsumoto | |

FOREIGN PATENT DOCUMENTS

| | | | | |
|---|---|---|---|---|
| CN | 108137342 A | 6/2018 | | |
| EP | 3950596 A1 | 2/2022 | | |
| JP | 2002-160922 A | 6/2002 | | |
| JP | 2002-220228 A | 8/2002 | | |
| JP | 2004-002148 A | 1/2004 | | |
| JP | 2005-139029 A | 6/2005 | | |
| JP | 2006-036576 A | 2/2006 | | |
| JP | 2008-081392 A | 4/2008 | | |
| JP | 2009-249275 A | 10/2009 | | |
| JP | 2015-189655 A | 11/2015 | | |
| JP | 2017-109880 A | 6/2017 | | |
| WO | 2014/196100 A1 | 12/2014 | | |
| WO | 2015/145787 A1 | 10/2015 | | |
| WO | 2017/072509 A1 | 5/2017 | | |
| WO | WO-2017072509 A1 * | 5/2017 | ......... | B01D 53/9418 |
| WO | 2020/195973 A1 | 10/2020 | | |
| WO | 2021/020104 A1 | 2/2021 | | |
| WO | 2021/049525 A1 | 3/2021 | | |

OTHER PUBLICATIONS

International Search Report issued in PCT/JP2022/003511; dated Mar. 22, 2022.
"Decision to Grant a Patent" Office Action issued in JP 2021-131514; mailed by the Japanese Patent Office dated Nov. 30, 2021.
The extended European search report issued by the European Patent Office dated Nov. 22, 2022, which corresponds to European Patent Application No. 22711427.9-1108 and is related to U.S. Appl. No. 17/777,244.
Communication pursuant to Rule 114(2) EPC mailed by the European Patent Office dated Mar. 30, 2023, which corresponds to European Patent Application No. 22711427.9-1108 and is related to U.S. Appl. No. 17/777,244.
Anonymous; Experimental data—porosity of Preparative Examples 4a and 11 of WO 2017/072509 A1.
An Office Action mailed by China National Intellectual Property Administration dated Sep. 23, 2023, which corresponds to Chinese Patent Application No. 202280001271.1 and is related to U.S. Appl. No. 17/777,244; with English translation.
An Office Action mailed by China National Intellectual Property Administration on Jan. 26, 2024, which corresponds to Chinese U.S. Appl. No. 202280001271.1 and is related to U.S. Appl. No. 17/777,244; with English translation.

* cited by examiner

*Primary Examiner* — Yong L Chu
(74) *Attorney, Agent, or Firm* — Studebaker & Brackett PC

(57) ABSTRACT

A zirconia-based porous body including an oxide of a rare earth element, in which when a pore volume in a pore distribution range of 30 nm or more and 200 nm or less after heating at 1150° C. for 12 hours under atmospheric pressure is defined as pore volume A and a pore volume in a pore distribution range of 30 nm or more and 200 nm or less before heating is defined as pore volume B, the pore volume A is 0.10 ml/g or more and 0.40 ml/g or less, and a pore volume retention ratio X in a pore distribution range of 30 nm or more and 200 nm or less represented by a formula [[(pore volume A)/(pore volume B)]×100] is 25% or more and 95% or less.

13 Claims, No Drawings

US 11,958,039 B2

ZIRCONIA-BASED POROUS BODY AND METHOD FOR MANUFACTURING ZIRCONIA-BASED POROUS BODY

TECHNICAL FIELD

The present invention relates to a zirconia-based porous body and a method for manufacturing a zirconia-based porous body.

BACKGROUND ART

Exhaust gas discharged from internal combustion engines of automobiles and the like, or combustion engines such as boilers contains hazardous substances such as carbon monoxide (CO), hydrocarbon (HC), and nitrogen oxide (NOx) which cause air pollution and the like. Efficient purification of these hazardous substances is an important issue from the viewpoint of preventing environmental contamination and the like. Exhaust gas purification techniques which can purify the three hazardous substances at the same time have been actively studied.

Patent Document 1 discloses a zirconia-based porous body having peaks in pore diameters of 8 to 20 nm and 30 to 100 nm in a pore distribution based on the BJH method and a total pore volume of 0.4 cc/g or more, and a zirconia-based porous body having a peak in a pore diameter of 20 to 110 nm in a pore distribution based on the BJH method and a total pore volume of 0.4 cc/g or more (particularly see claim 1).

Patent Document 2 discloses a zirconia-based porous body which has a total pore volume of at least 0.75 ml/g after heat treatment at 1000° C. for 3 hours and in which the pore volume of pores having a diameter of 10 to 100 nm after heat treatment at 1000° C. for 3 hours is at least 30% of the total pore volume (particularly see claim 1).

Patent Document 3 discloses a zirconia-based porous body having (1) a peak in a pore diameter of 20 to 100 nm in a pore distribution based on the BJH method, a P/W ratio of 0.05 or more, wherein W represents a half width of a peak obtained in a measured pore distribution curve and P represents a height of the peak, and a total pore volume of 0.5 cm$^5$/g or more; and (2) a peak in a pore diameter of 20 to 100 nm, the P/W ratio of 0.03 or more, a specific surface area of at least 40 m$^2$/g, and a total pore volume of 0.3 cm$^5$/g or more, after heat treatment at 1000° C. for 12 hours (particularly see claim 1).

Patent Document 4 discloses a CZ-based composite oxide in which a ratio (d/c) of a pore volume (d) after a durability test which heats the oxide in the atmosphere at a temperature condition of 1100° C. for 5 hours to a pore volume (c) before the durability test is 0.20 d/c<1.00 (see especially claim 2).

PRIOR ART DOCUMENT

Patent Documents

Patent Document 1: JP-A-2006-036576
Patent Document 2: JP-A-2008-081392
Patent Document 3: JP-A-2015-189655
Patent Document 4: WO 2014/196100

SUMMARY OF THE INVENTION

Problems to be Solved by the Invention

In order to reduce the amounts of CO, HC, and NOx emitted from automobiles and the like, improvement of the performance of exhaust gas purification catalysts is strongly required. In order to efficiently purify exhaust gas, it is necessary that a noble metal as a catalyst and exhaust gas are in sufficient contact with each other. For this purpose, it is necessary for the material used as a carrier of the noble metal to sufficiently diffuse the gas. In addition, the gas diffusibility of the carrier is more important under high space velocity (SV) conditions.

However, conventional materials (for example, the zirconia-based porous bodies disclosed in Patent Documents 1 to 4) have a problem that when exposed to a high temperature for a long time, pores are blocked, so that gas diffusibility is reduced. In recent years, there has been a demand for improvement in catalyst performance under temperature conditions higher than ever before, and there has been a demand for improvement in heat resistance of a carrier material in order to improve catalyst performance.

The present invention has been devised in view of the above-described problems, and an object of the present invention is to provide a zirconia-based porous body which can maintain high gas diffusibility even after exposed to a high temperature. Another object of the present invention is to provide a method for manufacturing the zirconia-based porous body.

Means for Solving the Problems

The present inventors have intensively studied a zirconium composite oxide. As a result, the following findings were obtained.

(1) Pores as small as 30 nm or less are effective for increasing the specific surface area, but disappear by sintering when exposed to a high temperature.

(2) Pores as large as 200 nm or more are often lost by wet pulverization at the time when a filter (for example, a honeycomb structure body) for collecting particulate matter is coated therewith, and slightly contribute to improvement of gas diffusibility.

The present inventors have found that the above problems can be solved by employing the following configuration, and have accomplished the present invention.

That is, the zirconia-based porous body according to the present invention is a zirconia-based porous body comprising an oxide of a rare earth element, wherein when a pore volume in a pore distribution range of 30 nm or more and 200 nm or less after heating at 1150° C. for 12 hours under atmospheric pressure is defined as pore volume A and a pore volume in a pore distribution range of 30 nm or more and 200 nm or less before heating is defined as pore volume B, the pore volume A is 0.10 ml/g or more and 0.40 ml/g or less, and a pore volume retention ratio X in a pore distribution range of 30 nm or more and 200 nm or less represented by formula (1) below is 25% or more and 95% or less:

<Pore volume retention ratio X in pore distribution range of 30 nm or more and 200 nm or less>

$$[(\text{Pore volume}A)/(\text{Pore volume}B)] \times 100 \qquad \text{Formula(1)}.$$

According to the above configuration, since the pore volume A is 0.10 ml/g or more, it can be said that high gas diffusibility is exhibited even after exposure to a high temperature.

In addition, since the retention ratio X is 25% or more, it can be said that high gas diffusibility is exhibited before and after exposure to a high temperature.

In addition, when the change in pore volume is large before and after exposure to a high temperature, the noble metal supported as a catalyst may be sintered along with the shrinkage of the zirconia-based porous body as a carrier. However, according to the above configuration, since the retention ratio X is 25% or more, it can be said that the change in pore volume is small. Therefore, sintering of a noble metal supported as a catalyst can be suppressed. As a result, high catalyst performance can be maintained.

When a zirconia-based porous body contains no rare earth element, the zirconia-based porous body has low heat resistance and low catalyst performance. Meanwhile, according to the above configuration, since the zirconia-based porous body contains an oxide of a rare earth element, the heat resistance and the catalyst performance of the zirconia-based porous body can be further improved.

In the above configuration, when a pore volume in an entire pore distribution range after heating at 1150° C. for 12 hours under atmospheric pressure is defined as pore volume C and a pore volume in an entire pore distribution range before heating is defined as pore volume D, the pore volume C is 0.40 ml/g or more and 1.50 ml/g or less, and a pore volume retention ratio Y in an entire pore distribution range represented by formula (2) below is preferably 30% or more and 95% or less:

<Pore volume retention ratio Y in entire pore distribution range>

$$[(\text{Pore volume}C)/(\text{Pore volume}D)] \times 100 \quad \text{Formula(2)}.$$

In order for high gas diffusibility to be exhibited even after exposure to a high temperature, it is preferable that the pore volume retention ratio in the entire pore distribution range is high. As described above, when the pore volume retention ratio in a pore distribution range of 30 nm or more and 200 nm or less is high, high gas diffusibility is obtained even after exposure to a high temperature, but when not only the pore volume retention ratio in the pore distribution range of 30 nm or more and 200 nm or less but also the pore volume retention ratio in the entire pore distribution range is high, it can be said that higher gas diffusibility is obtained.

According to the above configuration, since the pore volume C is 0.40 ml/g or more, it can be said that higher gas diffusibility is exhibited even after exposure to a high temperature.

In addition, since the retention ratio Y is 30% or more, it can be said that higher gas diffusibility is exhibited before and after exposure to a high temperature.

In the above configuration, a mode pore diameter in a pore distribution region of 1000 nm or less is preferably 50 nm or more and 150 nm or less.

When the mode pore diameter in the pore distribution region of 1000 nm or less is 50 nm or more and 150 nm or less, decrease in the pore volume B (a pore volume in a pore distribution range of 30 nm or more and 200 nm or less before heating at 1150° C. for 12 hours) can be suppressed, and the pore volume A (a pore volume in a pore distribution range of 30 nm or more and 200 nm or less after heating at 1150° C. for 12 hours) can be further increased.

In the above configuration, a specific surface area after heating at 1150° C. for 12 hours under atmospheric pressure is preferably 10 m$^2$/g or more and 40 m$^2$/g or less.

Sintering of the carrier of the catalyst invites decrease in the specific surface area of the carrier. The decrease in the specific surface area of the carrier invites sintering of the supported noble metal (catalyst). When the noble metal is sintered, the catalytic activity decreases and the exhaust gas purification performance of the catalyst decreases.

Accordingly, when the specific surface area after heating at 1150° C. for 12 hours is 10 m$^2$/g or more, the zirconia-based porous body can be said to have a high specific surface area even after the heat treatment. Therefore, the catalyst can be said to have high catalytic performance even after being exposed to a high temperature.

In the above configuration, the zirconia-based porous body comprises cerium oxide as the oxide of the rare earth element, and a content of the cerium oxide is preferably more than 0 mass % and 50 mass % or less with respect to an entire zirconia-based porous body.

When the zirconia-based porous body comprises cerium oxide in an amount of more than 0 mass % with respect to the entire zirconia-based porous body, sintering can be further suppressed.

In the above configuration, the zirconia-based porous body comprises a rare earth oxide other than cerium oxide as the oxide of the rare earth element, and a content of the rare earth oxide other than cerium oxide is preferably 1 mass % or more and 50 mass % or less with respect to an entire zirconia-based porous body.

When the zirconia-based porous body comprises the rare earth oxide other than cerium oxide in an amount of 1 mass % or more with respect to the entire zirconia-based porous body, sintering can be further suppressed.

In the above structure, the rare earth oxide other than cerium oxide is preferably one or more oxides selected from the group consisting of lanthanum oxide, neodymium oxide, praseodymium oxide, and yttrium oxide.

When the rare earth oxide other than cerium oxide is one or more oxides selected from the group consisting of lanthanum oxide, neodymium oxide, and praseodymium oxide, a higher sintering suppression effect can be obtained.

In the above configuration, the zirconia-based porous body comprises an oxide of other element, and the oxide of the other element is preferably one or more selected from the group consisting of (A) an oxide of a transition metal element other than a rare earth element, (B) an oxide of an alkaline earth metal element, and (C) oxides of one or more elements selected from the group consisting of Al, In, Si, P, Sn, and Bi.

When the zirconia-based porous body comprises an oxide of other element and the oxide of the other element is one or more selected from the group consisting of (A) an oxide of a transition metal element other than a rare earth element, (B) an oxide of an alkaline earth metal element, and (C) oxides of one or more elements selected from the group consisting of Al, In, Si, P, Sn, and Bi, a higher sintering suppression effect can be obtained.

In the above configuration, a content of the oxide of the other element is preferably more than 0 mass % and 40 mass % or less with respect to an entire zirconia-based porous body.

When the zirconia-based porous body comprises the oxide of the other element in a range of more than 0 mass % and 40 mass % or less with respect to the entire zirconia-based porous body, sintering can be further suppressed.

In the above configuration, the oxide of the other element is aluminum oxide, and a content of the aluminum oxide is preferably more than 0 mass % and 40 mass % or less with respect to an entire zirconia-based porous body.

When the oxide of the other element is aluminum oxide and the content of the aluminum oxide is more than 0 mass % and 40 mass % or less with respect to the entire zirconia-based porous body, a sintering suppression effect is higher.

A method for producing the zirconia-based porous body according to the present invention comprises:

step A of adding a sulfating agent solution to a zirconium salt solution at 100° C. or higher to produce basic zirconium sulfate;

step B of cooling the basic zirconium sulfate obtained in the step A to 80° C. or lower;

step C of aging the basic zirconium sulfate at a higher temperature than in the step A for 60 minutes or more after the step B;

step D of adding an alkali to a reaction liquid containing the basic zirconium sulfate after aging obtained in the step C to obtain a zirconium-containing hydroxide;

and step E of subjecting the zirconium-containing hydroxide obtained in the step D to heat treatment to obtain a zirconia-based porous body.

According to the above configuration, basic zirconium sulfate is produced by adding a sulfating agent solution to a zirconium salt solution at 100° C. or higher (step A), the obtained basic zirconium sulfate is once cooled to 80° C. or lower (step B), and then the basic zirconium sulfate is aged at a higher temperature than in step A for 60 minutes or more (step C).

By adopting such steps, it is possible to obtain a zirconia-based porous body in which a pore volume A in a pore distribution range of 30 nm or more and 200 nm or less after heating at 1150° C. for 12 hours under atmospheric pressure is 0.10 ml/g or more and 0.40 ml/g or less, and a pore volume retention ratio in a pore distribution range of 30 nm or more and 200 nm or less before and after heating at 1150° C. for 12 hours under atmospheric pressure is 25% or more and 95% or less.

The present inventor infers the reason as follows. In the step A, primary particles and secondary particles in which primary particles are aggregated are formed. The secondary particles have micropores therein. In the step C, further aggregation of the primary particles occurs to form meso-macropores.

In the above configuration, the method comprises step X of, in any one of the step A to the step C, adding one or more salts selected from the group consisting of (a) a salt of a rare earth element, (b) a salt of a transition metal element other than a rare earth element, (c) a salt of an alkaline earth metal element, and (d) a salt of at least one metal selected from the group consisting of Al, In, Si, P, Sn, and Bi.

When the method comprises step X of, in any one of the step A to the step C, adding one or more salts selected from the group consisting of (a) a salt of a rare earth element, (b) a salt of a transition metal element other than a rare earth element, (c) a salt of an alkaline earth metal element, and (d) a salt of at least one metal selected from the group consisting of Al, In, Si, P, Sn, and Bi, a higher sintering suppression effect can be imparted to the zirconia-based porous body finally obtained.

Effect of the Invention

According to the present invention, it is possible to provide a zirconia-based porous body capable of maintaining high gas diffusibility even after being exposed to a high temperature. The present invention can provide a method for manufacturing the zirconia-based porous body.

MODE FOR CARRYING OUT THE INVENTION

Hereinafter, embodiments of the present invention will be described. However, the present invention is not limited only to these embodiments. In the present specification, general zirconia is used, and contains 10 mass % or less of an impurity metal compound including hafnia.

[Zirconia-Based Porous Body]

A zirconia-based porous body according to the present embodiment will be described in detail later, but it is a composite oxide comprising zirconia and an oxide of a rare earth element as essential components. The application of the zirconia-based porous body according to the present embodiment is not particularly limited, but the zirconia-based porous body is useful as a catalyst carrier for exhaust gas purification. When the zirconia-based composite oxide is used as the catalyst carrier for exhaust gas purification, examples of a catalyst which can be supported include a noble metal catalyst.

<Pore Volume>

[1. Pore volume in a pore distribution range of 30 nm or more and 200 nm or less after heating at 1150° C. for 12 hours under atmospheric pressure (pore volume A)]

In the zirconia-based porous body according to the present embodiment, when a pore volume in a pore distribution range of 30 nm or more and 200 nm or less after heating at 1150° C. for 12 hours under atmospheric pressure is defined as pore volume A, the pore volume A is 0.10 ml/g or more and 0.40 ml/g or less.

The pore volume A is preferably 0.12 ml/g or more, more preferably 0.14 ml/g or more, still more preferably 0.16 ml/g or more, and particularly preferably 0.17 ml/g or more.

The pore volume A is preferably as large as possible, and is, for example, 0.35 ml/g or less, 0.30 ml/g or less, 0.25 ml/g or less, or the like.

[2. Pore volume retention ratio in a pore distribution range of 30 nm or more and 200 nm or less before and after heating at 1150° C. for 12 hours under atmospheric pressure (retention ratio X)]

In the zirconia-based porous body, when a pore volume in a pore distribution range of 30 nm or more and 200 nm or less after heating at 1150° C. for 12 hours under atmospheric pressure is defined as pore volume A and a pore volume in a pore distribution range of 30 nm or more and 200 nm or less before heating is defined as pore volume B, a pore volume retention ratio X in a pore distribution range of 30 nm or more and 200 nm or less represented by formula (1) below is 25% or more and 95% or less:

<Pore volume retention ratio X in pore distribution range of 30 nm or more and 200 nm or less>

$$[(\text{Pore volume}A)/(\text{Pore volume}B)] \times 100 \qquad \text{Formula(1)}.$$

The retention ratio X is preferably 27% or more, more preferably 28% or more, still more preferably 30% or more, and particularly preferably 33% or more.

The retention ratio X is preferably as large as possible, and is, for example, 80% or less, 70% or less, 60% or less, 50% or less, 45% or less, or the like.

Since the pore volume A is 0.10 ml/g or more, it can be said that high gas diffusibility is exhibited even after exposure to a high temperature.

In addition, since the retention ratio X is 25% or more, it can be said that high gas diffusibility is exhibited before and after exposure to a high temperature.

In addition, when the change in pore volume is large before and after exposure to a high temperature, the noble metal supported as a catalyst may be sintered along with the shrinkage of the zirconia-based porous body as a carrier. However, the zirconia-based porous body can be said to exhibit a small change in pore volume because the retention ratio X is 25% or more. Therefore, sintering of a noble metal supported as a catalyst can be suppressed. As a result, high catalyst performance can be maintained.

[3. Pore volume in a pore distribution range of 30 nm or more and 200 nm or less at initial stage (before heating) (pore volume B)]

In the zirconia-based porous body, when a pore volume in a pore distribution of 30 nm or more and 200 nm or less before heating is defined as pore volume B, the pore volume B is preferably 0.30 ml/g or more.

The pore volume B is preferably 0.40 ml/g or more, more preferably 0.45 ml/g or more, still more preferably 0.50 ml/g or more, and particularly preferably 0.53 ml/g or more.

The pore volume B is preferably as large as possible, and is, for example, 1.0 ml/g or less, 0.9 ml/g or less, 0.8 ml/g or less, 0.7 ml/g or less, 0.6 ml/g, or the like.

When the pore volume B is 0.30 ml/g or more, it can be said that the pore volume in a pore distribution range of 30 nm or more and 200 nm or less is relatively large in a state before exposure to a high temperature. Since the pore volume in a pore distribution range of 30 nm or more and 200 nm or less is relatively large in a state before exposure to a high temperature, the pore volume in the pore distribution range of 30 nm or more and 200 nm or less after exposure to a high temperature (pore volume A) can be further increased.

[4. Pore volume in the entire pore distribution range after heating at 1150° C. for 12 hours under atmospheric pressure (pore volume C)]

In the zirconia-based porous body according to the present embodiment, when a pore volume in the entire pore distribution range after heating at 1150° C. for 12 hours under atmospheric pressure is defined as pore volume C, the pore volume C is preferably 0.40 ml/g or more and 1.50 ml/g or less.

The pore volume C is preferably 0.45 ml/g or more, more preferably 0.48 ml/g or more, and still more preferably 0.51 ml/g or more.

The pore volume C is preferably as large as possible, and is, for example, 1.20 ml/g or less, 1.00 ml/g or less, 0.90 ml/g or less, 0.83 ml/g or less, or the like.

[5. Pore volume retention ratio in the entire pore distribution range before and after heating at 1150° C. for 12 hours under atmospheric pressure (retention ratio Y)]

In the zirconia-based porous body, when a pore volume in the entire pore distribution range after heating at 1150° C. for 12 hours under atmospheric pressure is defined as pore volume C and a pore volume in the entire pore distribution range before heating is defined as pore volume D, the pore volume retention ratio Y in the entire pore distribution range represented by formula (2) below is preferably 30% or more and 95% or less:

<Pore volume retention ratio Y in entire pore distribution range>

$$[(\text{Pore volume }C)/(\text{Pore volume }D)] \times 100 \qquad \text{Formula(2)}.$$

The retention ratio Y is preferably 35% or more, more preferably 40% or more, still more preferably 41% or more, particularly preferably 44% or more, and especially preferably 46% or more.

The retention ratio Y is preferably as large as possible, and is, for example, 80% or less, 70% or less, 65% or less, 64% or less, or the like.

In order for high gas diffusibility to be exhibited even after exposure to a high temperature, it is preferable that the pore volume retention ratio in the entire pore distribution range is high. As described above, when the pore volume retention ratio in a pore distribution range of 30 nm or more and 200 nm or less (retention ratio X) is high, high gas diffusibility is obtained even after exposure to a high temperature, but when not only the pore volume retention ratio in the pore distribution range of 30 nm or more and 200 nm or less but also the pore volume retention ratio in the entire pore distribution range is high, it can be said that higher gas diffusibility is obtained.

When the pore volume C is 0.40 ml/g or more, it can be said that higher gas diffusibility is exhibited even after exposure to a high temperature.

When the retention ratio Y is 30% or more, it can be said that higher gas diffusibility is exhibited before and after exposure to a high temperature.

[6. Pore volume in the entire pore distribution range at initial stage (before heating) (pore volume D)]

In the zirconia-based porous body, when a pore volume in the entire pore distribution range before heating is defined as pore volume D, the pore volume D is preferably 0.50 ml/g or more.

The pore volume D is preferably 0.70 ml/g or more, more preferably 0.80 ml/g or more, still more preferably 0.90 ml/g or more, particularly more preferably 1.00 ml/g or more, and especially preferably 1.05 ml/g or more.

The pore volume D is preferably as large as possible, and is, for example, 2.0 ml/g or less, 1.7 ml/g or less, 1.5 ml/g or less, 1.3 ml/g or less, or the like.

When the pore volume D is 0.50 ml/g or more, it can be said that the pore volume in the entire pore distribution range is relatively large in a state before exposure to a high temperature. Since the pore volume in the entire pore distribution range is relatively large in a state before exposure to a high temperature, the pore volume in the entire pore distribution range after exposure to a high temperature (pore volume C) can be further increased.

<Mode Pore Diameter>[1. Mode pore diameter in a pore distribution region of 1000 nm or less at initial stage (before heating)]

In the zirconia-based porous body, a mode pore diameter in a pore distribution region of 1000 nm or less at an initial stage (before heating) is preferably 50 nm or more and 150 nm or less.

The mode pore diameter is preferably 51 nm or more, more preferably 52 nm or more, still more preferably 53 nm or more, particularly preferably 55 nm or more, and especially preferably 59 nm or more.

The mode pore diameter is preferably 140 nm or less, more preferably 130 nm or less, still more preferably 120 nm or less, and particularly preferably 112 nm or less.

When the mode pore diameter in the pore distribution region of 1000 nm or less is 50 nm or more and 150 nm or less, decrease in the pore volume B (a pore volume in a pore distribution range of 30 nm or more and 200 nm or less before heating at 1150° C. for 12 hours) can be suppressed, and the pore volume A (a pore volume in a pore distribution range of 30 nm or more and 200 nm or less after heating at 1150° C. for 12 hours) can be further increased.

[2. Mode pore diameter in a pore distribution region of 1000 nm or less after heating at 1150° C. for 12 hours under atmospheric pressure]

The zirconia-based porous body preferably has a mode pore diameter of 55 nm or more and 180 nm or less in a pore distribution region of 1000 nm or less after heating at 1150° C. for 12 hours under atmospheric pressure.

The mode pore diameter after heating at 1150° C. for 12 hours under atmospheric pressure is preferably 60 nm or more, more preferably 63 nm or more, still more preferably 66 nm or more, and particularly preferably 74 nm.

The mode pore diameter after heating at 1150° C. for 12 hours under atmospheric pressure is preferably 170 nm or less, more preferably 160 nm or less, still more preferably 150 nm or less, particularly preferably 140 nm or less, and especially preferably 138 nm or less.

When the mode pore diameter after heating at 1150° C. for 12 hours under atmospheric pressure is 55 nm or more and 180 nm or less, the pore volume B (the pore volume in a pore distribution range of 30 nm or more and 200 nm or less before heating at 1150° C. for 12 hours) can be further increased.

Details of determination of the pore volume and the mode pore diameter are based on the methods described in Examples.

<Specific Surface Area>

[1. Specific surface area after heating at 1150° C. for 12 hours under atmospheric pressure]

The zirconia-based porous body preferably has a specific surface area of 10 $m^2/g$ or more and 40 $m^2/g$ or less after being heated at 1150° C. for 12 hours under atmospheric pressure.

Sintering of the carrier of the catalyst invites decrease in the specific surface area of the carrier. The decrease in the specific surface area of the carrier invites sintering of the supported noble metal (catalyst). When the noble metal is sintered, the catalytic activity decreases and the exhaust gas purification performance of the catalyst decreases.

Accordingly, when the specific surface area after heating at 1150° C. for 12 hours is 10 $m^2/g$ or more, the zirconia-based porous body can be said to have a high specific surface area even after the heat treatment. Therefore, the catalyst can be said to have high catalytic performance even after being exposed to a high temperature.

The specific surface area after heating at 1150° C. for 12 hours under atmospheric pressure is preferably 11 $m^2/g$ or more, more preferably 12 $m^2/g$ or more, and still more preferably 12.5 $m^2/g$ or more.

The specific surface area after heating at 1150° C. for 12 hours under atmospheric pressure is preferably as large as possible, and is, for example, 30 $m^2/g$ or less, 20 $m^2/g$ or less, 17 $m^2/g$ or less, 16.3 $m^2/g$ or less, or the like.

[2. Initial specific surface area]

The zirconia-based porous body preferably has a specific surface area (initial specific surface area) of 25 $m^2/g$ or more. When the specific surface area is 25 $m^2/g$ or more, the zirconia-based porous body can be said to have a relatively high specific surface area in a state before being exposed to a higher temperature. Since having a relatively high specific surface area in a state before being exposed to a high temperature, the specific surface area after being exposed to a high temperature can be further increased. Here, the specific surface area (initial specific surface area) refers to a specific surface area in a state where heat treatment, pulverization treatment or the like is not performed after the zirconia-based porous body is manufactured.

The specific surface area is preferably 30 $m^2/g$ or more, more preferably 35 $m^2/g$ or more, still more preferably 38 $m^2/g$ or more, and particularly preferably 45 $m^2/g$ or more.

The specific surface area is preferably as large as possible, and is, for example, 120 $m^2/g$ or less, 100 $m^2/g$ or less, 80 $m^2/g$ or less, 70 $m^2/g$ or less, or the like.

The specific surface area after heating at 1150° C. for 12 hours under atmospheric pressure and the specific surface area (initial specific surface area) refer to values obtained by the method described in Examples.

<Particle Diameter $D_{10}$>

The particle diameter $D_{10}$ of the zirconia-based porous body is preferably 0.1 μm or more and 50 μm or less. The particle diameter $D_{10}$ is more preferably 0.5 μm or more and 30 μm or less.

<Particle Diameter $D_{50}$>

The particle diameter $D_{50}$ of the zirconia-based porous body is preferably 0.1 μm or more and 100 μm or less. The particle diameter $D_{50}$ is more preferably 0.5 μm or more and 50 μm or less.

<Particle Diameter $D_{90}$>

The particle diameter $D_{90}$ of the zirconia-based porous body is preferably 1.0 μm or more and 500 μm or less. The particle diameter $D_{90}$ is more preferably 5.0 μm or more and 200 μm or less.

<Composition>

The zirconia-based porous body contains zirconia (zirconium oxide). The content of the zirconia is preferably 40 mass % or more, more preferably 45 mass % or more, and still more preferably 50 mass % or more where the entire zirconia-based porous body is 100 mass %. The upper limit value of the content of the zirconia is not particularly limited, but the content of the zirconia is preferably 99 mass % or less, and more preferably 98 mass % or less. When the content of the zirconia is 40 mass % or more and 99 mass % or less, the zirconia can be suitably used as the catalyst carrier The zirconia-based porous body contains an oxide of a rare earth element. The zirconia-based porous body preferably contains one or more oxides selected from rare earth elements. However, it is preferable that the zirconia-based porous body does not contain Pm. That is, it is more preferable that the zirconia-based porous body contains one or more oxides selected from rare earth elements other than Pm. Since the zirconia-based porous body contains an oxide of a rare earth element, the heat resistance and the catalyst performance of the zirconia-based porous body can be further improved.

The rare earth elements refer to Sc, Y, La, Ce, Pr, Nd, Pm, Sm, Eu, Gd, Tb, Dy, Ho, Er, Tm, Yb, and Lu.

The content of the oxide of the rare earth element (total content of the oxides of the rare earth elements) is preferably 5 mass % or more, more preferably 10 mass % or more, still more preferably 15 mass % or more, particularly preferably 20 mass % or more, especially preferably 25 mass % or more, and still especially preferably 30 mass % or more with respect to the entire zirconia-based porous body.

The content of the oxide of the rare earth element is preferably 60 mass % or less, more preferably 55 mass % or less, still more preferably 50 mass % or less, and particularly preferably 45 mass % or less.

When the content of the oxide of the rare earth element is 5 mass % or more and 60 mass % or less, higher heat resistance and higher catalyst performance are obtained.

The zirconia-based porous body preferably contains cerium oxide as the oxide of the rare earth element. When the zirconia-based porous body contains cerium oxide, the content of the cerium oxide is preferably more than 0 mass % and 50 mass % or less with respect to the entire zirconia-based porous body.

When the zirconia-based porous body comprises cerium oxide in an amount of more than 0 mass % with respect to the entire zirconia-based porous body, sintering can be further suppressed.

The content of the cerium oxide is preferably 5 mass % or more, more preferably 10 mass % or more, still more preferably 15 mass % or more, and particularly preferably 20 mass % or more with respect to the entire zirconia-based porous body. The content of the cerium oxide is preferably 50 mass % or less, more preferably 45 mass % or less, and still more preferably 40 mass % or less with respect to the entire zirconia-based porous body.

The zirconia-based porous body preferably contains a rare earth oxide other than cerium oxide as the oxide of the rare earth element. That is, the zirconia-based porous body preferably contains one or more oxides selected from rare earth elements other than cerium oxide. When the zirconia-based porous body contains a rare earth oxide other than cerium oxide, the content (total content) of the rare earth oxide other than cerium oxide is preferably 1 mass % or more and 50 mass % or less with respect to the entire zirconia-based porous body. When the zirconia-based porous body comprises the rare earth oxide other than cerium oxide in an amount of 1 mass % or more with respect to the entire zirconia-based porous body, sintering can be further suppressed.

The content of the rare earth oxide other than cerium oxide is preferably 1 mass % or more, more preferably 5 mass % or more, and still more preferably 10 mass % or more with respect to the entire zirconia-based porous body. The content of the rare earth oxide other than cerium oxide is preferably 30 mass % or less, more preferably 25 mass % or less, still more preferably 20 mass or less, particularly preferably 15 mass % or less, and especially preferably 10 mass % or less with respect to the entire zirconia-based porous body.

Among them, the rare earth oxide other than cerium oxide is preferably one or more selected from the group consisting of lanthanum oxide, neodymium oxide, praseodymium oxide, and yttrium oxide. When the oxide is one or more oxides selected from the group consisting of lanthanum oxide, neodymium oxide, and praseodymium oxide, a higher sintering suppression effect can be obtained.

The zirconia-based porous body may contain, in addition to the oxides of the rare earth elements, one or more oxides selected from the group consisting of:

A) oxides of transition metals (excluding rare earth elements),

B) alkaline earth metal oxides, and

C) one or more oxides selected from the group consisting of Al, In, Si, P, Sn and Bi.

Hereinafter, the elements shown in A) to C) are referred to as "other elements". When the zirconia-based porous body contains oxides of the other elements, the content of the oxides of the other elements may be more than 0%, preferably 0.1 mass % or more in terms of oxide where the entire zirconia-based porous body is 100 mass %. The upper limit of the content of the oxides of the other elements is not particularly limited, and may be 40 mass % or less, 30 mass % or less, 20 mass % or less, 10 mass % or less, or 5 mass % or less, or the like.

Examples of the transition metal include Ti, V, Cr, Mn, Fe, Co, Ni, Cu, Nb, Mo, Ta, and W. Examples of the alkaline earth metal include Mg, Ca, Sr, and Ba. Among the oxides of other elements, aluminum oxide ($Al_2O_3$) is particularly preferable from the viewpoint of the sintering suppression effect.

In addition, the zirconium composite oxide may contain impurities within a range not contradicting the gist of the present invention (for example, 0.5 mass % or less). The impurities are not particularly limited, and examples thereof include a component contained in a raw material, a component mixed during a production process, and a component that cannot be removed during a production process (for example, $SO_4$).

Preferable composition ratios of the zirconia-based porous body include combinations not exceeding 100% in total shown in the following (1) to (4) as examples.

(1) Zirconium oxide: 40% or more and 99% or less
Cerium oxide: 0% or more and 50% or less
Oxides of rare earth elements other than cerium oxide: 0% or more and 30% or less
Oxides of other elements: 0% or more and 40% or less (2) Zirconium oxide: 45% or more and 98% or less
Cerium oxide: 5% or more and 45% or less
Oxides of rare earth elements other than cerium oxide: 1% or more and 20% or less
Oxides of other elements: 0% or more and 37% or less (3) Zirconium oxide: 50% or more and 98% or less
Cerium oxide: 10% or more and 40% or less
Oxides of rare earth elements other than cerium oxide: 5% or more and 15% or less
Oxides of other elements: 0% or more and 35% or less (4) Zirconium oxide: 50% or more and 98% or less
Cerium oxide: 15% or more and 40% or less
Oxides of rare earth elements other than cerium oxide: 10% or more and 10% or less
Oxides of other elements: 0% or more and 32% or less According to the zirconia-based porous body according to the present embodiment, since the pore volume A is 0.10 ml/g or more, it can be said that the zirconia-based porous body has high gas diffusibility even after being exposed to a high temperature. In addition, since the retention ratio X is 25% or more, it can be said that high gas diffusibility is exhibited before and after exposure to a high temperature. In addition, since the retention ratio X is 25% or more, it can be said that the change in pore volume is small. Therefore, sintering of a noble metal supported as a catalyst can be suppressed. As a result, high catalyst performance can be maintained. In addition, since the oxide of the rare earth element is contained, the heat resistance and the catalyst performance of the zirconia-based porous body can be further improved.

[Method for Manufacturing Zirconia-Based Porous Body]

Hereinafter, an example of a method for manufacturing a zirconia-based porous body will be described. However, the method for manufacturing a zirconia-based porous body of the present invention is not limited to the following examples.

The method for producing a zirconia-based porous body according to the present embodiment comprises:

step A of adding a sulfating agent solution to a zirconium salt solution at 100° C. or higher to produce basic zirconium sulfate;

step B of cooling the basic zirconium sulfate obtained in the step A to 80° C. or lower;

step C of aging the basic zirconium sulfate at a higher temperature than in the step A for 60 minutes or more after the step B;

step D of adding an alkali to a reaction liquid containing the basic zirconium sulfate after aging obtained in the step C to obtain a zirconium-containing hydroxide;

and step E of subjecting the zirconium-containing hydroxide obtained in the step D to heat treatment to obtain a zirconia-based porous body.

<Step A>

In the method for producing a zirconia-based porous body according to the present embodiment, first, a sulfating agent is added to a zirconium salt solution at 100° C. or higher to form basic zirconium sulfate (step A).

The zirconium salt is only required to supply zirconium ions, and for example, zirconium oxynitrate, zirconium oxychloride, and zirconium nitrate and the like can be used. One or two or more thereof may be used. Among these, zirconium oxychloride is preferable in terms of its high productivity on an industrial scale.

A solvent for forming a zirconium salt solution may be selected according to the type of the zirconium salt. Usually, water (pure water or ion-exchanged water, the same applies hereinafter) is preferable.

The concentration of the zirconium salt solution is not particularly limited, but generally, 5 to 250 g (particularly, 20 to 150 g) of zirconium oxide ($ZrO_2$) is desirably contained in 1000 g of the solvent.

The sulfating agent is not limited as long as the sulfating agent reacts with zirconium ions to form a sulfate (that is, a sulfating reagent), and examples thereof include sodium sulfate, potassium sulfate, and ammonium sulfate. The sulfating agent may be in any form such as a powder form or a solution form, and is used in a solution state in the production method according to the present embodiment. The concentration of the solution may be appropriately set.

The sulfating agent is preferably added such that the weight ratio of sulfate radical ($SO_4^{2-}$) to $ZrO_2$ is 0.3 to 0.6. The free acid concentration of a mixed solution is preferably 0.2 to 2.2 N (normal). Examples of the free acid include sulfuric acid, nitric acid, and hydrochloric acid. The type of the free acid is not limited, but hydrochloric acid is preferable in terms of its high productivity on an industrial scale.

The sulfating agent is added after the temperature of the zirconium salt solution is adjusted to 100° C. or higher. The temperature of the zirconium salt solution is preferably 110° C. or higher, and more preferably 115° C. or higher. The temperature of the zirconium salt solution is preferably 150° C. or lower, and more preferably 140° C. or lower.

When the sulfating agent is added, it is preferable to add the sulfating agent after adjusting the temperature of the sulfating agent to 100° C. or higher. The addition of the sulfating agent is preferably performed after the temperature of the sulfating agent and the temperature of the zirconium salt solution are adjusted to the same temperature.

The pressure condition during sulfation is not particularly limited, and is preferably $1.0 \times 10^5$ Pa or more and $1.0 \times 10^6$ Pa or less, and more preferably $1.5 \times 10^5$ Pa or more and $5.0 \times 10^5$ Pa or less.

The zirconium salt solution and the sulfating agent usually react with each other at a temperature of 65° C. or higher to form basic zirconium sulfate. In the present embodiment, basic zirconium sulfate is produced by adding a sulfating agent to a zirconium salt solution having a temperature of 100° C. or higher. By adjusting the temperature to 100° C. or higher, the sulfation reaction can be accelerated, and generation of coarse aggregated particles can be suppressed. As a result, secondary particles having many micropores can be obtained.

It is preferable to hold the reaction liquid in an autoclave for a time in a range of 10 minutes or more and 60 minutes or less after adding the sulfating agent. The holding time is more preferably 12 minutes or more, and still more preferably 14 minutes or more. The holding time is more preferably 30 minutes or less, and still more preferably 20 minutes or less. The basic zirconium sulfate is not limited, and examples thereof include hydrates of compounds such as $ZrOSO_4 \cdot ZrO_2$, $5ZrO_2 \cdot 3SO_3$, and $7ZrO_2 \cdot 3SO_3$.

The basic zirconium sulfate may be one or a mixture of two or more thereof.

<Step B>

Next, the basic zirconium sulfate obtained in the step A is cooled to 80° C. or lower. The cooling temperature is preferably 60° C. or lower, more preferably 50° C. or lower, and still more preferably 40° C. or lower. The lower limit of the cooling temperature is not particularly limited, and is preferably a temperature at which the reaction liquid does not freeze, and examples thereof include 10° C. or higher and 20° C. or higher. The cooling rate does not need to be particularly controlled, and may be natural cooling. However, when the scale is large, it takes time to perform natural cooling, whereby the cooling may be performed using a heat exchanger or the like. In this case, the cooling rate may be appropriately set within a range of, for example, 0.1° C./min or more and 20° C./min or less.

The time for holding at a temperature of 80° C. or lower after cooling to 80° C. or lower is not particularly limited, and heating in step C may be started immediately after cooling to 80° C. or lower, or heating in step C described later may be started after holding at 80° C. or lower for a certain period (for example, 60 minutes or more and 120 minutes or less).

<Step C>

Next, the basic zirconium sulfate is aged at a higher temperature than in the step A for 60 minutes or more (step C). In the present embodiment, basic zirconium sulfate is produced at 100° C. or higher (step A), the produced basic zirconium sulfate is once cooled (step B), and the basic zirconium sulfate is aged again at a higher temperature than in the step A for 60 minutes or more, whereby the aggregation state can be changed.

Specifically, the present inventor infers that the aggregation state changes as follows.

Further aggregation of the particles formed in the step A proceeds by the step C. The micropores formed in the step A are expanded by this aggregation. As a result, coarse aggregated particles having mesopores and macropores in the particles are formed. It is presumed that thanks to the above, the pore volume A could be adjusted to 0.10 ml/g or more and 0.40 ml/g and the retention ratio X could be adjusted to 25% or more and 95% or less.

The aging temperature is required merely to be higher than that in the step A, and is preferably 10° C. or more higher than that in the step A, and more preferably 20° C. or more higher than that in the step A. Specifically, the aging temperature is preferably 120° C. or higher, and more preferably 130° C. or higher within a range higher than the aging temperature in the step A.

The aging time is preferably 270 minutes or more, and more preferably 300 minutes or more. The aging time is preferably 720 minutes or less, and more preferably 660 minutes or less from the viewpoint of productivity.

Thereafter, the basic zirconium sulfate after aging obtained in the step C is cooled to 80° C. or lower (step C-1). The cooling condition employed here may be appropriately set within the conditions described in the section of the step B.

<Step X>

In the method for producing a zirconia-based porous body according to the present embodiment, in any one of the step A to the step C, it is preferable to add one or more salts selected from the group consisting of (a) a salt of a rare earth element, (b) a salt of a transition metal element other than a rare earth element, (c) a salt of an alkaline earth metal element, and (d) a salt of at least one metal selected from the group consisting of Al, In, Si, P, Sn, and Bi (step X). By adding the salt, the heat resistance and the catalyst performance of the zirconia-based porous body can be further improved.

The step X is preferably performed in any one of the step A to the step C, and above all, it is preferable to perform the step X after the step B and before the step C. That is, it is preferable that the produced basic zirconium sulfate is cooled (after the step B), the salt is added before reheating (after the step X is performed), and then reheating is performed (the step C is performed).

The step X may be performed a plurality of times over a plurality of steps of the step A to the step C.

<Step D>

Next, a zirconium-containing hydroxide (zirconium hydroxide) is obtained by adding an alkali to the obtained reaction liquid containing basic zirconium sulfate after aging (step D). The alkali is not limited, and for example, ammonium hydroxide, ammonium bicarbonate, sodium hydroxide, and potassium hydroxide and the like can be used. Among these, sodium hydroxide is preferable from the viewpoint of industrial cost.

The amount of the alkali added is not particularly limited as long as zirconium hydroxide can be formed as a precipitate from a basic zirconium sulfate solution. Usually, the alkali is added such that the pH of the solution is 11 or more, and preferably 12 or more.

While as a method for adding the alkali there are two methods: (1) adding an alkali solution to the basic zirconium sulfate-containing reaction liquid and (2) adding the basic zirconium sulfate-containing reaction liquid to an alkali solution, the method is not particularly limited and either method may be used.

After the neutralization reaction, the zirconium hydroxide-containing solution is preferably held at 35 to 60° C. for 1 hour or more. As a result, the formed precipitate is aged while also facilitating filtration.

Next, the zirconium hydroxide is recovered by a solid-liquid separation method. For example, filtration, centrifugation, and decantation and the like can be used.

After the zirconium hydroxide is recovered, the zirconium hydroxide is preferably washed with water to remove adhered impurities.

The zirconium hydroxide may be dried by natural drying or heat drying.

<Step E>

Next, the zirconium hydroxide is subjected to heat treatment (calcination) to afford a zirconia-based porous body (step E). The heat treatment temperature is not particularly limited, but the zirconium hydroxide is preferably subjected to heat treatment at about 400 to 900° C. for about 1 to 5 hours. The heat treatment atmosphere is preferably air or an oxidizing atmosphere.

The obtained zirconia-based porous body may be subjected to treatment for disaggregating for the purpose of improving handleability, if necessary. For example, a pulverizer such as a planetary mill, a ball mill, or a jet mill can be used.

The method for manufacturing the zirconia-based porous body according to the present embodiment has been described above.

EXAMPLES

Hereinafter, the present invention will be described in detail with reference to Examples, but the present invention is not limited to the following Examples as long as the gist thereof is not deviated. A zirconia-based porous body obtained in each of Examples and Comparative Examples contains 1.3 to 2.5 mass % of hafnium oxide as an unavoidable impurity with respect to zirconium oxide (calculated by the following formula (X)).

([Mass of Hafnium Oxide]/([Mass of Zirconium Oxide]+[Mass of Hafnium Oxide]))×100(%)  <Formula(X)>

The maximum value and the minimum value of the content of each component shown in the following Examples should be considered as a preferable minimum value and a preferable maximum value of the present invention regardless of the content of other components.

In addition, the maximum value and the minimum value of the measured values shown in the following Examples should be considered to be the preferred minimum value and maximum value of the present invention regardless of the content (composition) of each component.

[Preparation of Zirconia-Based Porous Body]

Example 1

157 g (60 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2\times10^5$ Pa. After the temperature was raised to 120° C., 887 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry were added 150 g of a 20%-in-terms-of-$CeO_2$ cerium nitrate solution, 25 g of a 20%-in-terms-of-$Nd_2O_3$ neodymium nitrate solution, and 25 g of a 20%-in-terms-of-$Pr_6O_{11}$ praseodymium nitrate solution.

Next, the pressure was adjusted to $5\times10^5$ Pa, the temperature was raised to 150° C., and the mixture was held for 360 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 900° C. for 5 hours. The resulting calcined product was loosened with a mortar to afford a zirconia-based porous body according to Example 1.

Example 2

131 g (50 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2\times10^5$ Pa. After the temperature was raised to 120° C., 739 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, 200 g of a 20%-in-terms-of-$CeO_2$ cerium nitrate solution, 25 g of a 20%-in-terms-of-$Pr_6O_{11}$ praseodymium nitrate solution, and 25 g of a 20%-in-terms-of-$Y_2O_3$ yttrium nitrate solution were added.

Next, the pressure was adjusted to $5 \times 10^5$ Pa, the temperature was raised to 150° C., and the mixture was held for 360 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 900° C. for 5 hours. The resulting calcined product was loosened with a mortar to afford a zirconia-based porous body according to Example 2.

Example 3

183 g (70 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2 \times 10^5$ Pa. After the temperature was raised to 120° C., 1035 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry were added 100 g of a 20%-in-terms-of-$CeO_2$ cerium nitrate solution, 10 g of a 20%-in-terms-of-$La_2O_3$ lanthanum nitrate solution, 20 g of a 20%-in-terms-of-$Nd_2O_3$ neodymium nitrate solution, and 20 g of a 20%-in-terms-of-$Pr_6O_{11}$ praseodymium nitrate solution.

Next, the pressure was adjusted to $5 \times 10^5$ Pa, the temperature was raised to 150° C., and the mixture was held for 360 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 700° C. for 5 hours. The resulting calcined product was loosened with a mortar to afford a zirconia-based porous body according to Example 3.

Example 4

170 g (65 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2 \times 10^5$ Pa. After the temperature was raised to 120° C., 961 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry were added 100 g of a 20%-in-terms-of-$CeO_2$ cerium nitrate solution, 25 g of a 20%-in-terms-of-$La_2O_3$ lanthanum nitrate solution, and 50 g of a 20%-in-terms-of-$Y_2O_3$ yttrium nitrate solution.

Next, the pressure was adjusted to $5 \times 10^5$ Pa, the temperature was raised to 150° C., and the mixture was held for 360 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 800° C. for 5 hours. The resulting calcined product was loosened with a mortar to afford a zirconia-based porous body according to Example 4.

Example 5

157 g (60 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 130° C., and the pressure was adjusted to $3 \times 10^5$ Pa. After the temperature was raised to 130° C., 887 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry were added 150 g of a 20%-in-terms-of-$CeO_2$ cerium nitrate solution, 25 g of a 20%-in-terms-of-$Nd_2O_3$ neodymium nitrate solution, and 25 g of a 20%-in-terms-of-$Pr_6O_{11}$ praseodymium nitrate solution.

Next, the pressure was adjusted to $8 \times 10^5$ Pa, the temperature was raised to 170° C., and the mixture was held for 600 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 950° C. for 5 hours. The resulting calcined product was loosened with a mortar to afford a zirconia-based porous body according to Example 5.

Example 6

222 g (85 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2 \times 10^5$ Pa. After the temperature was raised to 120° C., 1256 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry were added 25 g of a 20%-in-terms-of-$La_2O_3$ lanthanum nitrate solution, 25 g of a 20%-in-terms-of-$Nd_2O_3$ neodymium nitrate solution, and 25 g of a 20%-in-terms-of-$Pr_6O_{11}$ praseodymium nitrate solution.

Next, the pressure was adjusted to $5 \times 10^5$ Pa, the temperature was raised to 150° C., and the mixture was held for 360 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 900° C. for 5 hours. The resulting calcined product was loosened with a mortar to afford a zirconia-based porous body according to Example 6.

Example 7

117 g (45 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2 \times 10^5$ Pa. After the temperature was raised to 120° C., 669 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry were added 100 g of a 20%-in-terms-of-$CeO_2$ cerium nitrate solution, 25 g of a 20%-in-terms-of-$La_2O_3$ lanthanum nitrate solution, and 300 g of a 10%-in-terms-of-$Al_2O_3$ aluminum nitrate solution.

Next, the pressure was adjusted to $5 \times 10^5$ Pa, the temperature was raised to 150° C., and the mixture was held for 360 minutes to age (step C).

Next, the mixture was allowed to cool to room temperature, and 25% ammonia water (alkali for neutralization) was added until the pH reached 10 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 1050° C. for 5 hours. The resulting calcined product was loosened with a mortar to afford a zirconia-based porous body according to Example 7.

Example 8

104 g (40 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2 \times 10^5$ Pa. After the temperature was raised to 120° C., 591 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry were added 250 g of a 20%-in-terms-of-$CeO_2$ cerium nitrate solution, 25 g of a 20%-in-terms-of-$La_2O_3$ lanthanum nitrate solution, and 25 g of a 20%-in-terms-of-$Y_2O_3$ yttrium nitrate solution.

Next, the pressure was adjusted to $5 \times 10^5$ Pa, the temperature was raised to 150° C., and the mixture was held for 360 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 900° C. for 5 hours. The resulting calcined product was loosened with a mortar to afford a zirconia-based porous body according to Example 8.

Example 9

143 g (55 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2 \times 10^5$ Pa. After the temperature was raised to 120° C., 1035 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry was added 225 g of a 20%-in-terms-of-$Pr_6O_{11}$ praseodymium nitrate solution.

Next, the pressure was adjusted to $5\times10^5$ Pa, the temperature was raised to 150° C., and the mixture was held for 360 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 900° C. for 5 hours. The resulting calcined product was loosened with a mortar to afford a zirconia-based porous body according to Example 9.

Example 10

153 g (59 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2\times10^5$ Pa. After the temperature was raised to 120° C., 1035 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry were added 75 g of a 20%-in-terms-of-$La_2O_3$ lanthanum nitrate solution, 125 g of a 20%-in-terms-of-$Y_2O_3$ yttrium nitrate solution, and 5 g of a 20%-in-terms-of-$P_2O_5$ phosphoric acid solution.

Next, the pressure was adjusted to $5\times10^5$ Pa, the temperature was raised to 150° C., and the mixture was held for 360 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 900° C. for 5 hours. The resulting calcined product was loosened with a mortar to afford a zirconia-based porous body according to Example 10.

Comparative Example 1

157 g (60 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2\times10^5$ Pa. After the temperature was raised to 120° C., 1035 g of 5% sodium sulfate (sulfating agent solution) was added at the same temperature, and the mixture was further held for 15 minutes. Thus, basic zirconium sulfate was obtained.

Next, the obtained basic zirconium sulfate was allowed to cool to room temperature (25° C.) to afford a slurry containing basic zirconium sulfate.

Next, to the obtained basic zirconium sulfate-containing slurry were added 100 g of a 20%-in-terms-of-$CeO_2$ cerium nitrate solution, 25 g of a 20%-in-terms-of-$Nd_2O_3$ neodymium nitrate solution, and 25 g of a 20%-in-terms-of-$Pr_6O_{11}$ praseodymium nitrate solution, and the mixture was mixed so as to be homogeneous.

Next, 25% sodium hydroxide (alkali for neutralization) was added over 60 minutes until the pH reached 13 or more to afford a zirconium hydroxide-containing slurry. Thereafter, the zirconium hydroxide-containing slurry was filtered and washed with water to afford a zirconium-containing hydroxide.

Next, the obtained zirconium-containing hydroxide was heat-treated (calcined) at 600° C. for 5 hours. The resulting calcined product was loosened with a mortar to afford a zirconia-based porous body according to Comparative Example 1.

Comparative Example 2

157 g (60 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2\times10^5$ Pa. After the temperature was raised to 120° C., 887 g of 5% sodium sulfate (sulfating agent solution) was added at the same temperature, and the mixture was further held for 15 minutes. Basic zirconium sulfate was thus obtained (step A).

Next, the obtained basic zirconium sulfate was allowed to cool to room temperature (25° C.) to afford a slurry containing basic zirconium sulfate (step B).

Next, to the obtained basic zirconium sulfate-containing slurry were added 150 g of a 20%-in-terms-of-$CeO_2$ cerium nitrate solution, 25 g of a 20%-in-terms-of-$Nd_2O_3$ neodymium nitrate solution, and 25 g of a 20%-in-terms-of-$Pr_6O_{11}$ praseodymium nitrate solution.

Next, the pressure was adjusted to $2\times10^5$ Pa, the temperature was raised to 110° C., and the mixture was held for 360 minutes to age (step C).

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 900° C. for 5 hours. The resulting calcined product was loosened with a mortar to afford a zirconia-based porous body according to Comparative Example 2.

Comparative Example 3

131 g (50 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.

The obtained zirconium salt solution was placed in an autoclave and heated to 120° C., and the pressure was adjusted to $2 \times 10^5$ Pa. After the temperature was raised to 120° C., 739 g of 5% sodium sulfate (sulfating agent solution) was added at the same temperature, and the mixture was further held for 15 minutes. Thus, basic zirconium sulfate was obtained.

Next, the obtained basic zirconium sulfate was allowed to cool to room temperature (25° C.) to afford a slurry containing basic zirconium sulfate.

Next, to the obtained basic zirconium sulfate-containing slurry were added 200 g of a 20%-in-terms-of-$CeO_2$ cerium nitrate solution, 25 g of a 20%-in-terms-of-$Pr_6O_{11}$ praseodymium nitrate solution, and 25 g of a 20%-in-terms-of-$Y_2O_3$ yttrium nitrate solution.

Next, the pressure was adjusted to $2 \times 10^5$ Pa, the temperature was raised to 150° C., and the mixture was held for 10 minutes.

Next, the mixture was allowed to cool to room temperature, and 25% sodium hydroxide (alkali for neutralization) was added until the pH reached 13 or more to afford a zirconium hydroxide-containing slurry. Thereafter, the zirconium hydroxide-containing slurry was filtered and washed with water to afford a zirconium-containing hydroxide (step D).

Next, the obtained zirconium-containing hydroxide was heat-treated (calcined) at 900° C. for 5 hours. The resulting calcined product was loosened with a mortar to afford a zirconia-based porous body according to Comparative Example 3.

Comparative Example 4

1 L of an aqueous solution containing zirconium oxychloride in an amount of 35 g in terms of zirconia was prepared, and ammonium peroxodisulfate was added up to 15 g/l, and the mixture was heated to 95° C. with stirring to form precipitation. Thereafter, ammonia water was added to adjust the pH to 9, the resultant was filtered, and then repulp with 1 L of 2% ammonia water three times to afford zirconium hydroxide.

To the thus obtained zirconium hydroxide in an amount of 35 g in terms of zirconia was added 500 g of pure water to prepare a zirconium hydroxide slurry having a pH of 10, and the temperature was raised to 80° C. (first step).

The obtained zirconium hydroxide slurry was held at 80° C., and 150 g of a room temperature hydrochloric acid solution containing 10 g of cerium oxide, 1 g of lanthanum oxide, 2 g of praseodymium oxide, and 2 g of neodymium oxide was added thereto with a tube pump, and the mixture was adsorbed to zirconium hydroxide with stirring. The pH at the time of the completion of the addition was 6.5, and the adsorption ratio of cerium ions, lanthanum ions, praseodymium ions, and neodymium ions (these ions are also referred to as rare earth ions) to zirconium hydroxide was 95% or more (second step).

The pH was adjusted to 10 by adding ammonia water as an alkali to the zirconium hydroxide slurry with rare earth ions such as cerium ions adsorbed, obtained in the second step. As a result, all of the rare earth ions which were not adsorbed to the zirconium hydroxide in the second step precipitated as a hydroxide (third step). This was confirmed from the fact that cerium ions, lanthanum ions, praseodymium ions, and neodymium ions (rare earth ions) were not detected in the filtrate obtained in the subsequent fourth step.

The hydroxide slurry obtained in the third step was filtered with a Nutsche filter, and the obtained hydroxide was repulped with 1 L of 2% ammonia water three times to afford a cerium-zirconium hydroxide cake (fourth step).

The hydroxide cake obtained in the fourth step was dried at 120° C., then pulverized with a mortar, and calcined in the air at 700° C. for 3 hours to afford a CZ-based composite oxide (fifth step).

[Measurement of (Initial) Pore Volume before Heating]

The pore distribution of the zirconia-based porous body of each of Examples and Comparative Examples was obtained by a mercury intrusion method using a pore distribution measuring device ("Autopore IV9500" manufactured by Micromeritics). The measurement conditions were as follows.

<Measurement Conditions>
Measuring device: pore distribution measuring device (Autopore IV9500 manufactured by Micromeritics)
Measuring range: 0.0036 to 10.3 μm
Number of measurement points: 120 points
Mercury contact angle: 140 degrees
Mercury surface tension: 480 dyne/cm Using the obtained pore distribution, the pore volume in a pore distribution range of 30 nm or more and 200 nm or less before heating (pore volume B) and the pore volume in the entire pore distribution range before heating (pore volume D) were determined. The results are shown in Table 1 (the column of pore volume "Fresh").

In addition, using the obtained pore distribution, the mode pore diameter in the pore distribution region of 1000 nm or less at the initial stage (before heating) was determined. The results are shown in Table 1 (the column of mode pore diameter "Fresh").

[Measurement of Pore Volume after Heating at 1150° C. for 12 Hours Under Atmospheric Pressure]

The zirconia-based porous body of each of Examples and Comparative Examples was heated at 1250° C. for 10 hours under atmospheric pressure (0.1013 MPa). The pore distribution of the zirconia-based porous body after heating at 1250° C. for 10 hours under atmospheric pressure was obtained by a mercury intrusion method using a pore distribution measuring device ("Autopore IV9500" manufactured by Micromeritics). The measurement conditions were the same as in "Measurement of pore volume before heating".

Using the obtained pore distribution, the pore volume in a pore distribution range of 30 nm or more and 200 nm or less after heating at 1150° C. for 12 hours under atmospheric pressure (pore volume A) and the pore volume in the entire pore distribution range after heating at 1150° C. for 12 hours under atmospheric pressure (pore volume C) were determined. The results are shown in Table 1 (the column of pore volume "1150° C.").

Using the obtained pore distribution, the mode pore diameter in the pore distribution region of 1000 nm or less after heating at 1150° C. for 12 hours under atmospheric pressure was determined. The results are shown in Table 1 (the column of mode pore diameter "1150° C.").

In addition, using the pore volume A and the pore volume B obtained above, the pore volume retention ratio X in a pore distribution range of 30 nm or more and 200 nm or less was determined by the following formula (1).

In addition, using the pore volume C and the pore volume D obtained above, the pore volume retention ratio Y in the entire pore distribution range was determined by the following formula (2). The results are shown in Table 1 (the column of pore volume retention ratio).

<Pore volume retention ratio X in pore distribution range of 30 nm or more and 200 nm or less>

$$[(\text{Pore Volume}A)/(\text{Pore Volume}B)] \times 100 \quad \text{Formula (1).}$$

<Pore volume retention ratio Y in entire pore distribution range>

$$[(\text{Pore volume}C)/(\text{Pore volume}D)] \times 100 \quad \text{Formula (2).}$$

[Measurement of (Initial) Specific Surface Area Before Heating]

The specific surface area of the zirconia-based porous body of each of Examples and Comparative Examples was measured by the BET method using a specific surface area meter ("Macsorb" manufactured by Mountec). The results are shown in Table 1 (the column of specific surface area "Fresh").

[Measurement of Specific Surface Area after Heating at 1150° C. for 12 Hours Under Atmospheric Pressure]

The zirconia-based porous body of each of Examples and Comparative Examples was heated at 1150° C. for 12 hours under atmospheric pressure (0.1013 MPa). The specific surface area of the zirconia-based porous body after heating at 1150° C. for 12 hours under atmospheric pressure was measured in the same manner as in "Measurement of specific surface area before heat treatment". The results are shown in Table 1 (the column of specific surface area 1150° C.)

[Measurement of Particle Diameters $D_{10}$, $D_{50}$, and $D_{90}$]

0.15 g of the zirconia-based porous body (powder) of each of Examples and Comparative Examples and 40 ml of a 0.2% sodium hexametaphosphate aqueous solution were placed in a 50-ml beaker, and dispersed in an ultrasonic cleaner ("W-113A" manufactured by Yamato Scientific Co., Ltd.) for 5 minutes, followed by placing the dispersed product in the device (laser diffraction type particle diameter distribution measuring device ("SALD-2300" manufactured by Shimadzu Corporation)), and then particle diameters $D_{10}$, $D_{50}$, and $D_{90}$ were measured. The results are shown in Table 1.

TABLE 1

| | | Unit | Example 1 | Example 2 | Example 3 | Example 4 | Example 5 | Example 6 | Example 7 | Example 8 |
|---|---|---|---|---|---|---|---|---|---|---|
| Composition | $ZrO_2$ | wt % | 60 | 50 | 70 | 65 | 60 | 85 | 45 | 40 |
| | $CeO_2$ | wt % | 30 | 40 | 20 | 20 | 30 | — | 20 | 50 |
| | $La_2O_3$ | wt % | — | — | 2 | 5 | — | 5 | 5 | 5 |
| | $Nd_2O_3$ | wt % | 5 | — | 4 | — | 5 | 5 | — | — |
| | $Pr_6O_{11}$ | wt % | 5 | 5 | 4 | — | 5 | 5 | — | — |
| | $Y_2O_3$ | wt % | — | 5 | — | 10 | — | — | — | 5 |
| | $Al_2O_3$ | wt % | — | — | — | — | — | — | 30 | — |
| | $P_2O_5$ | wt % | — | — | — | — | — | — | — | — |
| Specific surface area | Fresh | m²/g | 45.2 | 52.9 | 69.2 | 57.3 | 38.7 | 51.5 | 40.1 | 49.5 |
| | After heating at 1150° C. | m²/g | 12.5 | 12.6 | 16.3 | 15.3 | 11.6 | 13.2 | 18.2 | 11.8 |
| Pore volume (Fresh) | Total pore volume (pore volume D) | ml/g | 1.06 | 1.26 | 1.14 | 1.18 | 1.30 | 1.10 | 1.11 | 1.19 |
| | 30-200 nm (pore volume B) | ml/g | 0.53 | 0.60 | 0.53 | 0.60 | 0.59 | 0.58 | 0.41 | 0.48 |
| Pore volume (1150° c.) | Total pore volume (pore volume C) | ml/g | 0.51 | 0.55 | 0.63 | 0.48 | 0.83 | 0.51 | 0.45 | 0.42 |
| | 30-200 nm (pore volume A) | ml/g | 0.18 | 0.17 | 0.22 | 0.20 | 0.20 | 0.21 | 0.12 | 0.15 |
| Pore volume retention ratio (1150° c./Fresh) | Total pore volume (retention ratio Y) | % | 49 | 44 | 55 | 41 | 64 | 46 | 41 | 35 |
| | 30-200 nm (retention ratio X) | % | 33 | 28 | 42 | 33 | 33 | 36 | 29 | 31 |
| Mode pore diameter | Fresh | nm | 66 | 59 | 53 | 66 | 112 | 59 | 32 | 59 |
| | After heating at 1150° C. | nm | 74 | 74 | 74 | 66 | 138 | 66 | 55 | 74 |
| Particle diameter | $D_{10}$ | μm | 1.1 | 1.2 | 1.2 | 1.0 | 1.5 | 1.3 | 2.3 | 1.8 |
| | $D_{50}$ | μm | 13.6 | 16.3 | 16.4 | 10.8 | 18.5 | 13.5 | 9.1 | 20.3 |
| | $D_{90}$ | μm | 38.5 | 50.6 | 57.0 | 30.2 | 72.1 | 41.2 | 42.3 | 82.0 |

| | | | Example 9 | Example 10 | Comparative Example 1 | Comparative Example 2 | Comparative Example 3 | Comparative Example 4 |
|---|---|---|---|---|---|---|---|---|
| Composition | $ZrO_2$ | | 55 | 59 | 60 | 60 | 50 | 70 |
| | $CeO_2$ | | — | — | 30 | 30 | 40 | 20 |
| | $La_2O_3$ | | — | 15 | — | — | — | 2 |
| | $Nd_2O_3$ | | — | — | 5 | 5 | — | 4 |
| | $Pr_6O_{11}$ | | 45 | — | 5 | 5 | 5 | 4 |
| | $Y_2O_3$ | | — | 25 | — | — | 5 | — |
| | $Al_2O_3$ | | — | — | — | — | — | — |
| | $P_2O_5$ | | — | 1 | — | — | — | — |
| Specific surface area | Fresh | | 41.2 | 65.8 | 44.1 | 54.2 | 80.5 | 78.5 |
| | After heating at 1150° C. | | 10.8 | 12.5 | 7.6 | 7.2 | 8.6 | 8.9 |
| Pore volume (Fresh) | Total pore volume (pore volume D) | | 1.08 | 1.25 | 1.56 | 1.66 | 1.65 | 1.56 |
| | 30-200 nm (pore volume B) | | 0.51 | 0.54 | 0.43 | 0.65 | 0.50 | 0.47 |

TABLE 1-continued

| | | | | | | | |
|---|---|---|---|---|---|---|---|
| Pore volume (1150° c.) | Total pore volume (pore volume C) | 0.49 | 0.53 | 0.39 | 0.30 | 0.38 | 0.43 |
| | 30-200 nm (pore volume A) | 0.14 | 0.16 | 0.08 | 0.08 | 0.08 | 0.09 |
| Pore volume retention ratio (1150° c./Fresh) | Total pore volume (retention ratio Y) | 45 | 42 | 25 | 18 | 23 | 28 |
| | 30-200 nm (retention ratio X) | 27 | 30 | 19 | 13 | 16 | 19 |
| Mode pore diameter | Fresh | 66 | 53 | 23 | 29 | 39 | 39 |
| | After heating at 1150° C. | 74 | 66 | 59 | 48 | 48 | 44 |
| Particle diameter | $D_{10}$ | 1.1 | 0.8 | 1.0 | 1.9 | 0.9 | 5.7 |
| | $D_{50}$ | 16.4 | 8.8 | 8.5 | 10.9 | 7.5 | 38.5 |
| | $D_{90}$ | 35.9 | 21.7 | 15.7 | 24.4 | 12.3 | 121 |

The invention claimed is:

1. A zirconia-based porous body comprising an oxide of a rare earth element, wherein
when a pore volume in a pore distribution range of 30 nm or more and 200 nm or less after heating at 1150° C. for 12 hours under atmospheric pressure is defined as pore volume A and a pore volume in a pore distribution range of 30 nm or more and 200 nm or less before heating is defined as pore volume B,
the pore volume A is 0.10 ml/g or more and 0.40 ml/g or less,
the pore volume B is 0.40 ml/g or more and 1.0 ml/g or less, and
a pore volume retention ratio X in a pore distribution range of 30 nm or more and 200 nm or less represented by formula (1) below is 25% or more and 95% or less:
<Pore volume retention ratio X in pore distribution range of 30 nm or more and 200 nm or less>

[(Pore volume $A$)/(Pore volume $B$)]×100    Formula(1).

2. The zirconia-based porous body according to claim 1, wherein
when a pore volume in an entire pore distribution range after heating at 1150° C. for 12 hours under atmospheric pressure is defined as pore volume C and a pore volume in an entire pore distribution range before heating is defined as pore volume D,
the pore volume C is 0.40 ml/g or more and 1.50 ml/g or less, and
a pore volume retention ratio Y in an entire pore distribution range represented by formula (2) below is 30% or more and 95% or less:

<Pore volume retention ratio $Y$ in entire pore distribution range>[(Pore volume$C$)/(Pore volume$D$)]×100    Formula (2).

3. The zirconia-based porous body according to claim 1, wherein a mode pore diameter in a pore distribution region of 1000 nm or less is 50 nm or more and 150 nm or less.

4. The zirconia-based porous body according to claim 1, a specific surface area after heating at 1150° C. for 12 hours under atmospheric pressure is 10 m²/g or more and 40 m²/g or less.

5. The zirconia-based porous body according to claim 1, wherein the zirconia-based porous body comprises cerium oxide as the oxide of the rare earth element, and a content of the cerium oxide is more than 0 mass % and 50 mass % or less with respect to an entire zirconia-based porous body.

6. The zirconia-based porous body according to claim 1, wherein the zirconia-based porous body comprises a rare earth oxide other than cerium oxide as the oxide of the rare earth element, and a content of the rare earth oxide other than cerium oxide is 1 mass % or more and 50 mass % or less with respect to an entire zirconia-based porous body.

7. The zirconia-based porous body according to claim 6, wherein the rare earth oxide other than cerium oxide is one or more oxides selected from the group consisting of lanthanum oxide, neodymium oxide, praseodymium oxide, and yttrium oxide.

8. The zirconia-based porous body according to claim 1, wherein
the zirconia-based porous body comprises an oxide of other element, and
the oxide of the other element is one or more selected from the group consisting of (A) an oxide of a transition metal element other than a rare earth element, (B) an oxide of an alkaline earth metal element, and (C) oxides of one or more elements selected from the group consisting of Al, In, Si, P, Sn, and Bi.

9. The zirconia-based porous body according to claim 8, wherein a content of the oxide of the other element is more than 0 mass % and 40 mass % or less with respect to an entire zirconia-based porous body.

10. The zirconia-based porous body according to claim 8, wherein
the oxide of the other element is aluminum oxide, and
a content of the aluminum oxide is more than 0 mass % and 40 mass % or less with respect to an entire zirconia-based porous body.

11. A method for producing the zirconia-based porous body according to claim 1, the method comprising:
step A of adding a sulfating agent solution to a zirconium salt solution at 100° C. or higher to produce basic zirconium sulfate;
step B of cooling the basic zirconium sulfate obtained in the step A to 80° C. or lower;
step C of aging the basic zirconium sulfate at a higher temperature than in the step A for 60 minutes or more after the step B;
step D of adding an alkali to a reaction liquid containing the basic zirconium sulfate after aging obtained in the step C to obtain a zirconium-containing hydroxide; and
step E of subjecting the zirconium-containing hydroxide obtained in the step D to heat treatment to obtain a zirconia-based porous body.

12. The method for producing the zirconia-based porous body according to claim 11, further comprising step X of, in any one of the step A to the step C, adding one or more salts selected from the group consisting of (a) a salt of a rare earth element, (b) a salt of a transition metal element other than a rare earth element, (c) a salt of an alkaline earth metal element, and (d) a salt of at least one metal selected from the group consisting of Al, In, Si, P, Sn, and Bi.

13. The zirconia-based porous body according to claim 1, wherein the pore volume A is 0.16 ml/g or more and 0.40 ml/g or less.

\* \* \* \* \*